Nov. 10, 1942.   R. R. DUPLER   2,301,526
GLOBE MOUNTING
Filed Jan. 27, 1941
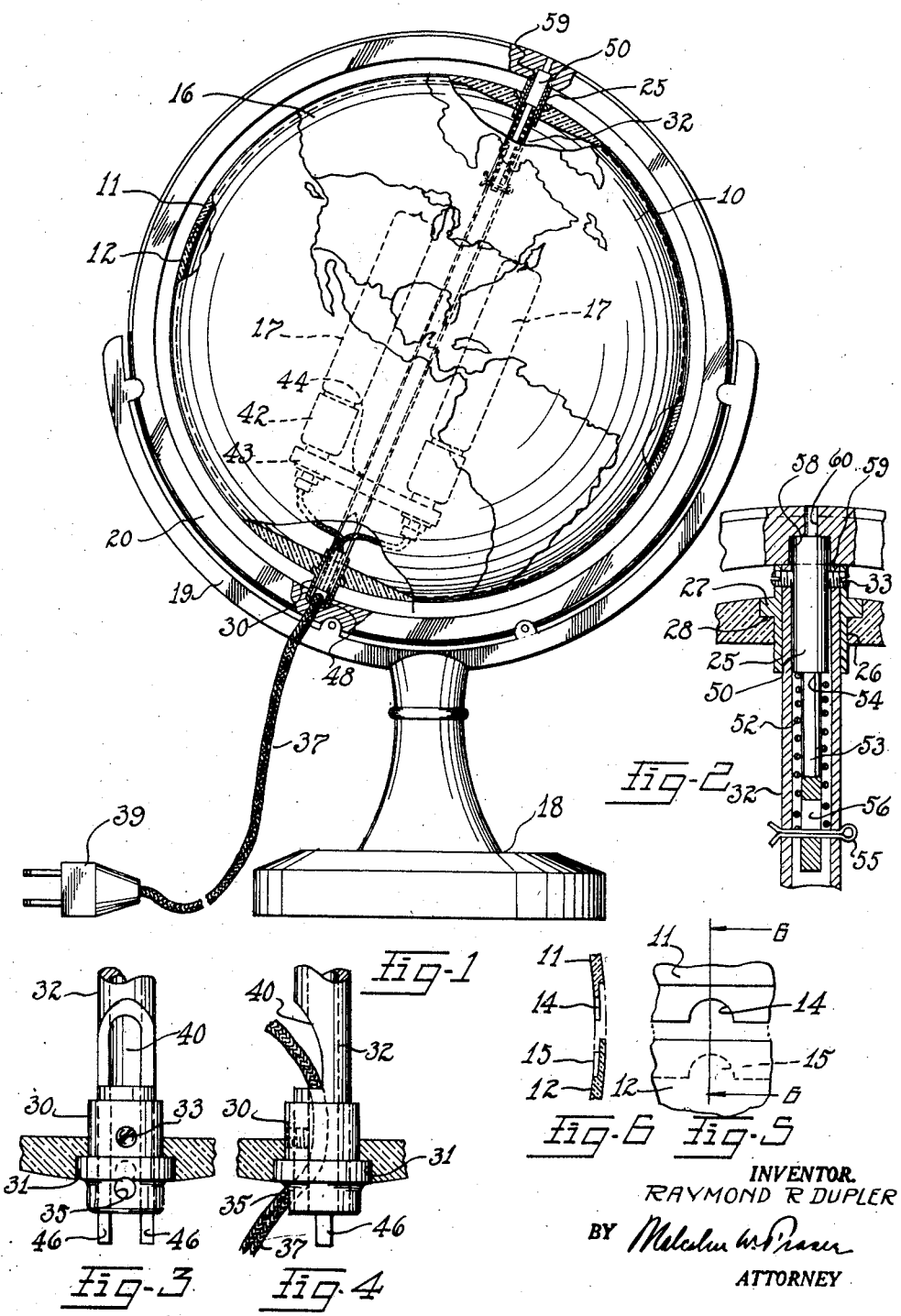
INVENTOR.
RAYMOND R DUPLER
BY Malcolm W Fraser
ATTORNEY Patented Nov. 10, 1942

2,301,526

UNITED STATES PATENT OFFICE 2,301,526

GLOBE MOUNTING

Raymond R. Dupler, Toledo, Ohio

Application January 27, 1941, Serial No. 376,075

3 Claims. (Cl. 35—46)

This invention relates to terrestrial globes in which a globe containing a map of the world has a light source therein for illuminating the surface of the globe.

An object of the invention is to produce a new and improved terrestrial globe of the above character in which means are provided for connecting the globe sections together, such means also serving as pivotal connections for the globe as well as lead wire conduit means for the light source.

Another object of the invention is to provide a sectional globe with means for locating the sections in proper relation and thereby present relative movement therebetween when in assembled relation.

A further object of the invention is to provide a globe with a tubular polar axis member arranged to connect the globe sections together in such manner that the globe may be readily removed from its support.

Another object of the invention is to provide a globe with a light source having electrical connecting means extending into the globe at the pivotal axis thereof and arranged so that the globe, light source and connecting means may be removed as a unit from a support or base.

Other objects and advantages will hereinafter appear and for purposes of illustration but not of limitation, an embodiment of the invention is shown on the accompanying drawing in which:

Figure 1 is a side elevation of a terrestrial globe with portions broken away to illustrate the features of the invention;

Figure 2 is an enlarged vertical sectional view of the upper pivot or bearing arrangement;

Figure 3 is an enlarged fragmentary detail view of the lower bearing;

Figure 4 is a side view of the structure shown in Figure 3;

Figure 5 is a fragmentary detail showing a method of joining the upper and lower globe sections; and Figure 6 is a sectional detail view taken substantially on a line 6—6 of Figure 5.

The illustrated embodiment of the invention comprises a globe consisting of a glass, or the like, sphere 10 made up of two parts 11 and 12 fitting together in overlapping relationship. In order that the upper and lower sections of the globe may be properly located and joined together, the abutting edges of the sections 11 and 12 are provided with notches 14 and projections 15, respectively, which cooperate to prevent relative rotary movement of the sections. The notches and projections are so located that the upper and lower halves of a map 16 may be readily properly positioned and maintained in such position by means hereinafter described.

The map 16 may be of paper or may be painted on the globe or otherwise suitably displayed in such manner that a light source such as lamps 17 inside of the globe will illuminate the outer surface thereof. The globe 10 is mounted on a base 18, an arcuate bracket 19 and meridian ring 20 being provided between the base and the globe to support the latter.

An upper bearing or pivot assembly comprising a flanged bushing 25 is received in a hole or opening 26 in the globe section 11, the flange portion 27 being located in an enlarged socket portion 28 of the opening 26. A similar arrangement is provided at the opposite pole of the globe in the flanged bushing 30 received in a shouldered opening 31. The ends of a tubular connector 32 are received within the bushings 25 and 30, set screws 33 being provided to secure the bushings in position on the tube in such manner as to retain the globe sections in assembled relation. Bushing 30 and the portion of the tube therein are provided with a bore at 35 to permit the passage therethrough of wires 37 having a connecting plug 39 at the outer end. The wires 37 pass into the hollow interior of tube 30 and out through an opening 40 formed by providing a notch in the wall of the tube above the bushing 30. The lamps to which the wires 37 are connected have been illustrated as mounted in suitable sockets or bases 42 carried on a bracket 43 secured to the tube 30 by welding as at 44, but it is to be understood that the light source may be otherwise suitably located within the globe 10.

The lower extremity of the tube 30 has been illustrated as provided with a pair of depending tongues 46 serving as the bearing or pivotal connection to the meridian ring 20, a bore 48 being provided in the ring to receive such bearing means. In order that the globe may be assembled in and disassembled from the ring 20, the upper bearing or pivotal connection includes a pin or plunger 50 received in and projecting from the upper end of tube 30. The pin 50 is urged outwardly by means of a spring 52 encircling a reduced portion 53 of the pin and interposed between a shoulder 54 on the pin and a cotter pin 55 projecting through openings in the tube 30 and a slot 56 provided adjacent the inner end of the pin. In its outward position, the pin 50 engages the bore 58 of a bearing portion 59 in the ring 20, and serves as the other pivot for the globe. If desired, a separate bearing or bushing may be provided in the ring. A small bore 60 extends from the bore 58 to the outer surface of ring 20 through which a suitable instrument may be projected to force pin 50 inwardly to release the pin from engagement with the ring portion 59. Due to the arrangement of tongues 46 at the lower end of the tube 30, it will be clear that upon release of pin 50, the globe can be readily rocked out of assembled relation with the ring 20. It will also be noted that removal of the globe from the ring 20 requires no disconnection of the wiring to the light source.

It will thus be apparent that I have provided an exceedingly simple arrangement which permits ready assembly and disassembly of the globe. The simple construction and arrangement enable the parts to be manufactured and assembled at a relatively low cost.

Numerous changes in details of construction, arrangement and operation may be effected without departing from the spirit of the invention, especially as defined in the appended claims.

What I claim is:

1. In a globe, a support, a pair of semi-spherical sections fitting together in overlapping relationship, interfitting notches and projections on said sections respectively for holding same against relative rotary movement, the polar region of each section having an aperture opening into an enlarged socket portion, a bushing fitting each aperture and having a flange seating in the respective socket portion, a tubular connector having opposite ends received in said bushings, means associated with each bushing engaging said support for mounting same thereon, and set screws securing each bushing to the adjacent end of said connector, thereby to retain said semi-spherical sections in assembled relation.

2. In a globe, a support, a pair of semi-spherical sections fitting together in overlapping relationship, interfitting notches and projections on said sections respectively for holding same against relative rotary movement, the polar region of each section having an aperture opening into an enlarged socket portion, a bushing fitting each aperture and having a flange seating in the respective socket portion, a tubular connector having opposite ends received in said bushings, means associated with each bushing engaging said support for mounting same thereon, set screws securing each bushing to the adjacent end of said connector, thereby to retain said semi-spherical sections in assembled relation, a lamp bracket on said connector and arranged within one of said semi-spherical sections, one of said bushings being apertured and said connector having a side aperture, and an electrical cord passing through the bushing and connector apertures to said bracket.

3. In a globe, a support, a pair of semi-spherical sections fitting together in overlapping relationship, the polar region of each section having an aperture opening into an enlarged socket portion, a bushing fitting each aperture and having a flange seating in the respective socket portion, a tubular connector having opposite ends received in said bushings, means associated with each bushing engaging said support for mounting same thereon, said mounting means comprising a spring tensioned pin associated with one bushing, said support adjacent to said pin being socketed to receive same and also being apertured to receive an instrument for depressing said pin for releasing the globe thereby, and depending tongues on the other bushing and engaging an adjacent portion of said support, and set screws securing each bushing to the adjacent end of said connector, thereby to retain said semi-spherical sections in assembled relation.

RAYMOND R. DUPLER.